US011179848B2

(12) United States Patent
Hume et al.

(10) Patent No.: US 11,179,848 B2
(45) Date of Patent: Nov. 23, 2021

(54) APPARATUS SYSTEM AND METHOD OF CONTROLLING A ROBOTIC DEVICE

(71) Applicant: Sony Interactive Entertainment Inc., Tokyo (JP)

(72) Inventors: Oliver George Hume, London (GB); Michael Eder, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 232 days.

(21) Appl. No.: 16/448,747

(22) Filed: Jun. 21, 2019

(65) Prior Publication Data

US 2020/0016749 A1    Jan. 16, 2020

(30) Foreign Application Priority Data

Jul. 10, 2018    (GB) .................................. 1811288

(51) Int. Cl.
*G05D 1/00* (2006.01)
*B25J 9/16* (2006.01)

(52) U.S. Cl.
CPC .......... *B25J 9/1664* (2013.01); *G05D 1/0005* (2013.01); *G05B 2219/40341* (2013.01)

(58) Field of Classification Search
CPC ........ B25J 9/1664; B25J 9/1646; B25J 9/162; B25J 9/163; B25J 9/1656; B25J 9/1674;
(Continued)

(56) References Cited

U.S. PATENT DOCUMENTS

2002/0007230 A1    1/2002   Ueno
2005/0156562 A1*   7/2005   Cohen ................ H02J 7/00714
                                                   320/107

(Continued)

FOREIGN PATENT DOCUMENTS

EP    3603903 A1    2/2020
WO    2018012446 A1  1/2018

OTHER PUBLICATIONS

Extended European Search Report for corresponding EP Application No. 19175379.7, dated Jan. 9, 2019.

(Continued)

*Primary Examiner* — Spencer D Patton
(74) *Attorney, Agent, or Firm* — Matthew B. Dernier, Esq.

(57) ABSTRACT

An apparatus for controlling one or more operations performed by a robotic device in response to a status of a power source includes: a monitoring unit configured to monitor one or more parameters associated with the power source that provides power to the robotic device and to determine one or more performance indicators for the power source based on one or more of the parameters, a processor configured to, under instruction of a program that defines a plurality of modes for one or more operations performed by the robotic device when reacting to a stimulus, assign one of the plurality of modes to an operation of the robotic device in response to one or more of the performance indicators for the power source, where an amount of energy required from the power source to perform the operation varies according to which mode is assigned to the operation, and a control unit configured to control the robotic device to perform the operation in accordance with the mode assigned to the operation when reacting to the stimulus.

12 Claims, 9 Drawing Sheets

(58) Field of Classification Search
CPC ... B25J 19/005; G05D 1/0217; G05D 1/0223; G05D 1/0005; G06N 3/008; G05B 2219/39361; G05B 2219/39407; G05B 2219/40341
See application file for complete search history.

(56) References Cited

U.S. PATENT DOCUMENTS

| | | |
|---|---|---|
| 2008/0109114 A1 | 5/2008 | Orita |
| 2016/0075021 A1 | 3/2016 | Cohen |
| 2019/0138019 A1* | 5/2019 | Hayashi ............... G05D 1/0088 |

OTHER PUBLICATIONS

Examination Report for corresponding GB Application No. 1811288.8, 2 pages, dated Apr. 1, 2021.
Examination Report for corresponding GB Application No. 1811288.8, 2 pages, dated Sep. 3, 2020.
Combined Search and Examination Report for corresponding GB Application No. 1811288.8, dated Jan. 9, 2019.

* cited by examiner

APPARATUS SYSTEM AND METHOD OF CONTROLLING A ROBOTIC DEVICE

BACKGROUND OF THE INVENTION

Field of the Invention

The present invention relates to an apparatus, system and method of controlling a robotic device in response to a status of a power source.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electronic devices such as smartphones, laptop computers, tablets and robotic devices require electrical power in order to perform their functions, with some functions requiring more power consumption than others. Portable devices may comprise batteries for storing chemical energy which allow functions to be performed when the device is not plugged into a power outlet by converting the stored chemical energy into electrical energy as required. Limitations associated with battery technologies mean that such portable devices have a limited period of time (battery life) in which functions can be performed before requiring recharging. Even with recent advances in battery performance, the need to periodically recharge portable devices is a major consideration for most users.

These issues are particularly relevant in the field of robotic devices where conventional charging techniques using a wired connection may not always be suitable. Power consumption associated with driving one or more actuators of the robotic device can place significant constraints on the battery life of the robotic device thereby limiting the range of the robotic device. For robotic devices that use a docking station for recharging, the maximum distance that the device can venture from the docking station is restricted by the battery life, and in some scenarios, such as when navigating a home environment, the energy stored in the battery may be insufficient to return the robotic device to the docking station.

Means and techniques to control operations performed by robotic devices are therefore advantageous.

The present invention seeks to control a robotic device in response to a status of one or more power sources that provide power to the robotic device in order to optimise one or more operations performed by the robotic device for the one or more power sources.

SUMMARY OF THE INVENTION

In a first aspect, there is provided an apparatus for controlling one or more operations performed by a robotic device in response to a status of a power source in accordance with disclosed embodiments.

In another aspect, there is provided a method of controlling one or more operations performed by a robotic device in response to a status of a power source in accordance with disclosed embodiments.

In another aspect, there is provided computer software which, when executed by a computer, causes the computer to carry out a method of controlling one or more operations performed by a robotic device in response to a status of a power source devices in accordance with disclosed embodiments.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
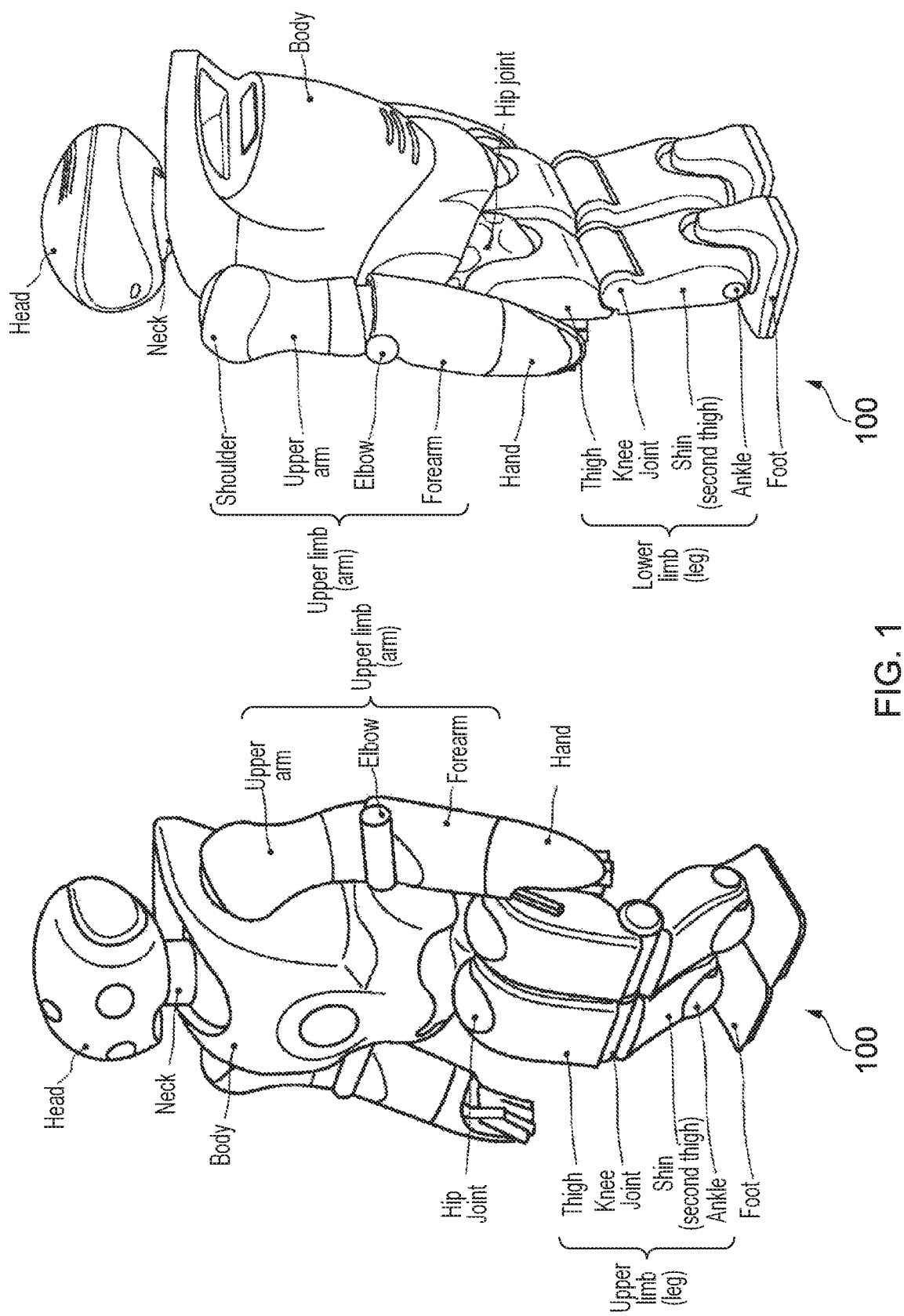
FIG. 1 is a schematic diagram showing front and rear elevations of a robot, in accordance with embodiments of the present invention.

Referring now to the drawings, wherein like reference numerals designate identical or corresponding parts throughout the several views, a robot platform 100 for implementing embodiments of the present invention may take the form of any suitable robotic device, or simulation of a robotic device, as applicable.

The terms "coupled" and "connected," along with their derivatives, may be used herein to describe structural relationships between components of the system for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

The robot platform may have any suitable physical features. Hence movement, where required, may be achieved by wheels, tracks, articulated limbs, internal mass displacement or any other suitable means. Manipulation, where required, may be achieved by one or more of a mechanical hand, pincer or any other hooking or gripping system, such as a suction or electromagnetic attachment mechanism or a hook or clip, and any further optional articulation such as one or more jointed arms. Vision, where required, may be achieved by optical camera and/or infra-red camera/detector, mounted on the robot and/or located within the environment navigated by the robot. Other situational awareness systems such as ultrasound echolocation, or detection of metal tracks and/or electrically charged tracks, and proximity systems such as whiskers coupled to sensors, or pressure pads, may also be considered. Control of the robot may be provided by running suitable software instructions on a processor of the robot and/or a processor of a remote computer communicating with the robot, for example via a wireless protocol.

FIG. 1 illustrates front and rear views of an exemplary legged locomotive robot platform 100. As shown, the robot includes a body, head, right and left upper limbs, and right and left lower limbs for legged movement. A control unit 80 (not shown in FIG. 1) within the body provides a control system for the robot.

Each of the right and left lower limbs includes a thigh, knee joint, second thigh (calf/shin), ankle and foot. The lower limb is coupled by a hip joint to the bottom of the trunk. Each of the right and left upper limb includes an upper arm, elbow joint and forearm. The upper limb is coupled by a shoulder joint to each upper edge of the trunk. Meanwhile, the head is coupled by a neck joint near to the upper end centre of the trunk.

Figure 2:
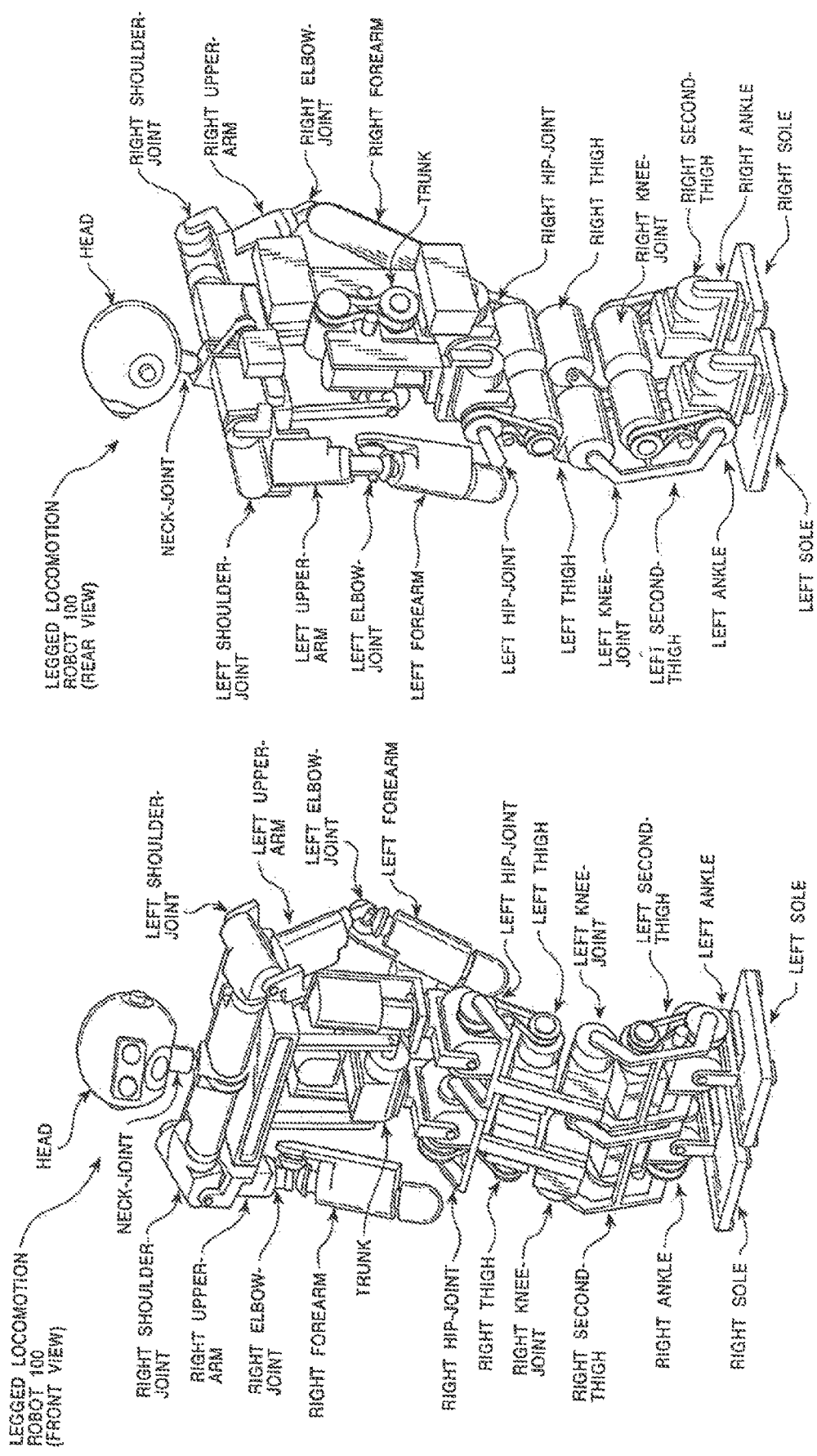
FIG. 2 is a schematic diagram showing front and rear elevations of points of articulation of a robot, in accordance with embodiments of the present invention.

FIG. 2 illustrates front and rear views of the robot, showing its points of articulation (other than the hands).

Figure 3:
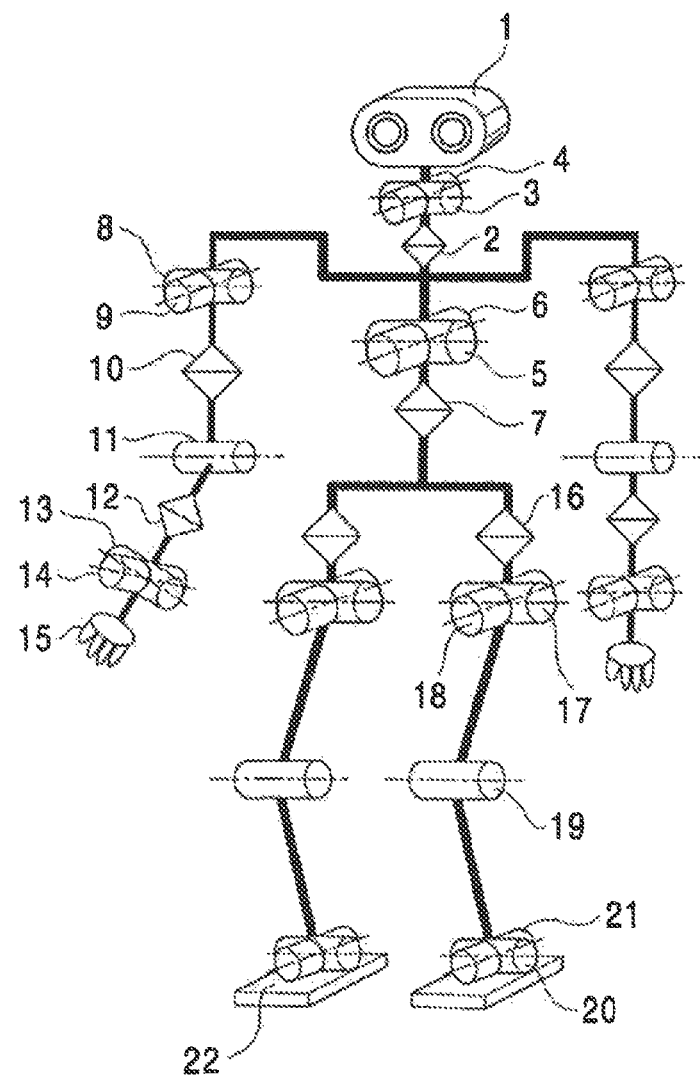
FIG. 3 is a schematic diagram illustrating degrees of freedom at respective points of articulation of a robot, in accordance with embodiments of the present invention.

FIG. 3 then illustrates the degrees of freedom available for each point of articulation.

Referring to these Figures, a neck joint for supporting the head 1 has 3 degrees of freedom: a neck-joint yaw-axis 2, a neck-joint pitch-axis 3, and a neck-joint roll-axis 4. Meanwhile each arm has 7 degrees of freedom; a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. Typically the hand 15 also has a multi-joints multi-degrees-of-freedom structure including a plurality of fingers. However, these are omitted for simplicity of explanation. The trunk has 3 degrees of freedom; a trunk pitch-axis 5, a trunk roll-axis 6, and a trunk yaw-axis 7. Each leg constituting the lower limbs has 6 degrees of freedom; a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In the exemplary robot platform, the cross point between the hip-joint pitch-axis 17 and the hip-joint roll-axis 18 defines a hip-joint location of the legged walking robot 100 according to the embodiment. Again for simplicity it is assumed that the foot itself has no degrees of freedom, but of course this is non-limiting. As a result the exemplary robot 100 has 32 (=3+7×2+3+6×2) degrees of freedom in total. It will be appreciated however that this is merely exemplary, and other robot platforms may have more or fewer degrees of freedom.

Each degree of freedom of the exemplary legged locomotive robot platform 100 is implemented by using an actuator. For example, a small AC servo actuator that is directly coupled to a gear and that houses a one-chip servo-system may be used, although any suitable actuator may be considered, such as a linear servo, electroactive polymer muscle, pneumatic, piezoelectric, or the like.

It will be appreciated that any desired operation that the robot platform is capable of may be implemented by control signals issued by a control system to: one or more of the actuators of the robot (or to simulated actuators in a simulation, as applicable), to adjust the pose of the robot within its available degrees of freedom; one or more light emitting devices of the robot; one or more audio emitting devices of the robot; one or more haptic feedback devices of the robot; one or more cameras of the robot; one or more transmitters of the robot.

Figure 4:
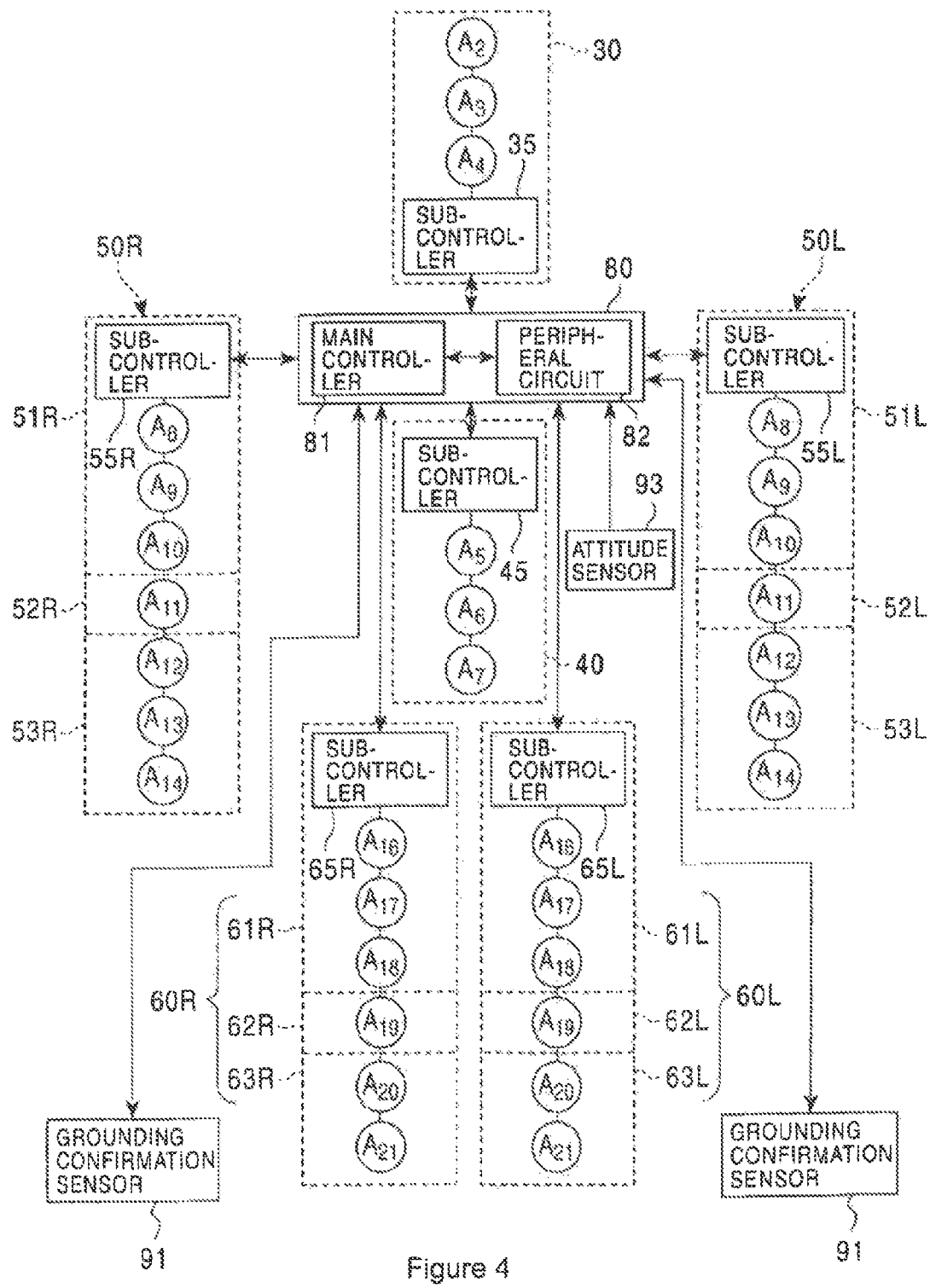
FIG. 4 is a schematic diagram of a control system for a robot, in accordance with embodiments of the present invention.

FIG. 4 schematically illustrates an exemplary control system for the robot platform 100.

A control unit 80 operates to co-ordinate the operations of the robot. The control unit 80 has a main control unit 81 including main circuit components (not shown) such as a CPU (central processing unit) and a memory, and typically a peripheral circuit 82 including an interface (not shown) for sending and receiving data and/or commands to and from a power supply circuit (not shown) and each component of the robot. The control unit may comprise a communication interface and communication device for receiving data and/or commands by remote-controlling. The control unit can be located anywhere suitable within the robot.

As shown in FIG. 4, the robot has logical units 30 (head), 40 (torso), and 50R/L and 60R/L each representing the corresponding one of four human limbs. The degrees-of-freedom of the robot 100 shown in FIG. 3 are implemented by the corresponding actuator within each unit. Hence the head unit 30 has a neck-joint yaw-axis actuator A2, a neck-joint pitch-axis actuator A3, and a neck-joint roll-axis actuator A4 disposed therein for representing the neck-joint yaw-axis 2, the neck-joint pitch-axis 3, and the neck-joint roll-axis 4, respectively. Meanwhile the trunk unit 40 has a trunk pitch-axis actuator A5, a trunk roll-axis actuator A6, and a trunk yaw-axis actuator A7 disposed therein for representing the trunk pitch-axis 5, the trunk roll-axis 6, and the trunk yaw-axis 7, respectively. Similarly the arm units 50R/L are broken down into upper-arm units 51R/L, elbow-joint units 52R/L, and forearm units 53R/L. Each of the arm units 50R/L has a shoulder-joint pitch-axis actuator A8, a shoulder-joint roll-axis actuator A9, an upper-arm yaw-axis actuator A10, an elbow-joint pitch-axis actuator A11, a forearm yaw-axis actuator A2, a wrist-joint pitch-axis actuator A13, and a wrist-joint roll-axis actuator A14 disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively. Finally the leg units 60R/L are broken down into thigh units 61R/L, knee units 62R/L, and second-thigh units 63R/L. Each of the leg units 60 R/L has a hip-joint yaw-axis actuator A16, a hip-joint pitch-axis actuator A17, a hip-joint roll-axis actuator A18, a knee-joint pitch-axis actuator A19, an ankle-joint pitch-axis actuator A20, and an ankle-joint roll-axis actuator A21 disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively. Optionally the head unit 30, the trunk unit 40, the arm units 50, and the leg units 60 may have sub-controllers 35, 45, 55, and 65 for driving the corresponding actuators disposed therein.

Hence by issuing appropriate commands, the main controller (81) can control the driving of the joint actuators included in the robot 100 to implement the desired operation. For example, the controller may implement a walking action by implementing successive phases, as follows:

(1) Single support phase (left leg) with the right leg off the walking surface;
(2) Double support phase with the right foot touching the walking surface;
(3) Single support phase (right leg) with the left leg off the walking surface; and
(4) Double support phase with the left foot touching the walking surface.

Each phase in turn comprises the control of a plurality of actuators, both within the relevant leg and potentially elsewhere in the robot, for example moving the opposing arm and/or attitude of the torso to maintain the centre of gravity of the robot over the supporting foot or feet.

Optionally, to detect the manner and/or extent of a physical interaction with an object and/or the environment, physical sensors may be provided.

Hence in the exemplary robot, the feet 22 may each have one or more grounding detection sensors 91 (e.g. a proximity sensor or microswitch) for detecting the grounding of the feet 22 mounted on legs 60R and 60L respectively, and the torso is provided with an attitude sensor 93 (e.g. an acceleration sensor and/or a gyro-sensor) for measuring the trunk attitude. Outputs of the one or more grounding detection sensors 91 are used to determine whether each of the right and left legs is in a standing state or a swinging state during the walking action, whilst an output of the attitude sensor 93 is used to detect an inclination and an attitude of the trunk. Other sensors may also be provided, for example on a gripping component of the robot, to detect that an object is being held.

The robot may also be equipped with sensors to provide additional senses. Hence for example the robot may be equipped with one or more cameras, enabling the control unit (or a remote system to which sensor-based data is sent) to recognise a user of the robot, or a target object for retrieval. Similarly one or more microphones may be provided to enable voice control or interaction by a user. Any other suitable sensor may be provided, according to the robot's intended purpose. For example, a security robot intended to patrol a property may include heat and smoke sensors, and GPS.

Hence more generally, a robot platform may comprise any suitable form factor and comprise those degrees of freedom necessary to perform an intended task or tasks, achieved by the use of corresponding actuators that respond to control signals from a local or remote controller that in turn operates under suitable software instruction to generate a series of control signals corresponding to a performance of the intended task(s).

In order to provide software instruction to generate such control signals, a robot software development system may be provided for developing control sequences for desired operations, and/or for developing decision making logic to enable the robot control system to respond to user commands and/or environmental features.

As part of this development system, a virtual robot (i.e. a simulation) may be used in order to simplify the process of implementing test software (for example by avoiding the need to embed test software within robot hardware that may not have simple user-serviceable parts, or to simulate an environment or action where a mistake in the software could damage a real robot). The virtual robot may be characterised by the dimensions and degrees of freedom of the robot, etc., and an interpreter or API operable to respond to control signals to adjust the state of the virtual robot accordingly.

Control software and/or scripts to use with such software may then be developed using, and to use, any suitable techniques, including rule based/procedural methods, and/or machine learning/neural network based methods.

Figure 5:
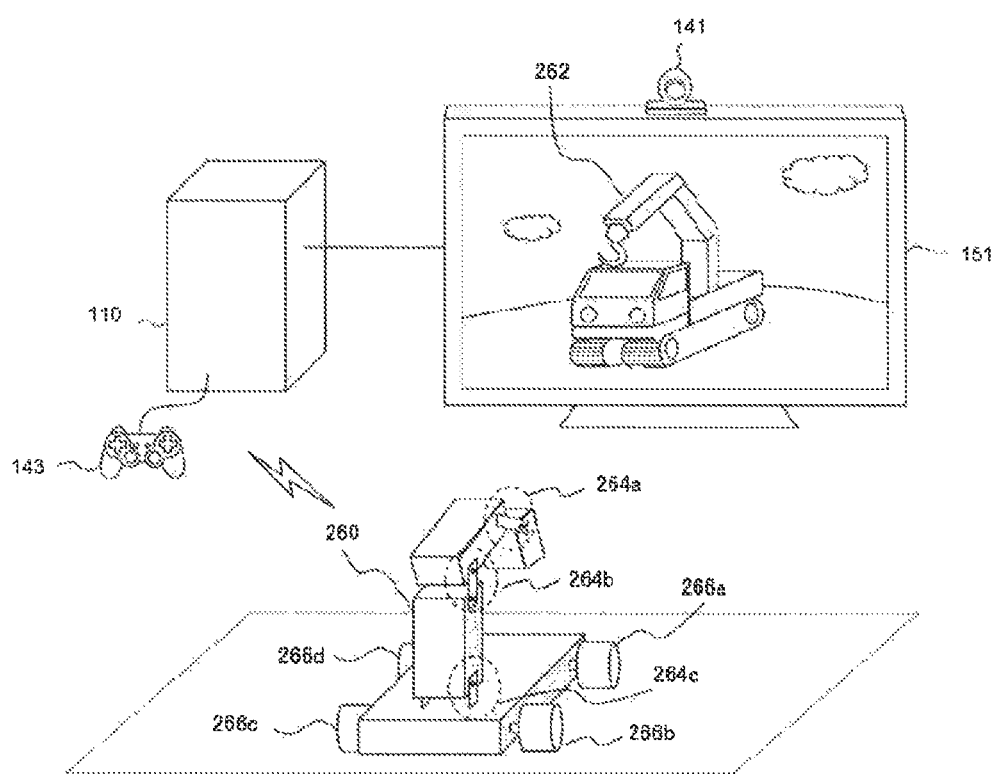
FIG. 5 is a schematic diagram of an interactive robot system in accordance with embodiments of the present invention.

Referring to FIG. 5, in an exemplary usage scenario a (toy) real robot crane 260 and a corresponding simulation (virtual robot crane 262) interact for entertainment purposes, for example mirroring each other's actions or behaving in a complementary manner, and/or using sensor data from the real or virtual robot to control actions of the other. The virtual robot may be graphically embellished compared to the real robot, for example having a face, or resembling an object or creature only approximated by the real robot.

In this example, the robot platform 260 has motorised wheels 266a-d and one articulated arm with actuators 264a-c. However it will be appreciated that any suitable form factor may be chosen, such as for example the humanoid robot 100 of FIG. 1, or a dog-shaped robot (not shown) or a spheroidal robot (not shown).

In FIG. 5, control of both the virtual and real robots is performed by a general purpose computer (110) operating under suitable software instructions, such as the Sony® PlayStation 4®. A user can interact with the PlayStation and hence optionally indirectly interact with one or both of the real and virtual robots using any suitable interface, such as a videogame controller 143. The PlayStation can detect the state of the real robot by receiving telemetry and other status data from the robot, and/or from analysis of an image of the real robot captured by a video camera 141. Alternatively or in addition the PlayStation can assume the state of the real robot based on expected outcomes of the commands sent to it. Hence for example, the PlayStation may analyse captured images of the real robot in expected final poses to determine its positon and orientation, but assume the state of the robot during intermediate states such as transitions between poses.

In the example scenario, the user provides inputs to control the real robot via the PlayStation (for example indicating an amount and direction of travel with one joystick, and a vertical and horizontal position of the arm end with another joystick). These inputs are interpreted by the PlayStation into control signals for the robot. Meanwhile the virtual simulation of the robot may also be controlled in a corresponding or complementary manner using the simulation technique described above, according to the mode of play.

Alternatively or in addition, the user may directly control the real robot via its own interface or by direct manipulation, and the state of the robot may be detected by the PlayStation (e.g. via image analysis and/or telemetry data from the robot as described previously) and used to set a corresponding state of the virtual robot.

It will be appreciated that the virtual robot may not be displayed at all, but may merely act as a proxy for the real robot within a virtual environment. Hence for example the image of the real robot may be extracted from a captured video image and embedded within a generated virtual environment in an augmented reality application, and then actions of the real robot can be made to appear to have an effect in the virtual environment by virtue of those interactions occurring with a corresponding virtual robot in the environment mirroring the state of the real robot.

Alternatively, a virtual robot may not be used at all, and the PlayStation may simply provide control and/or state analysis for the real robot. Hence for example the PlayStation may monitor the robot via the camera, and cause it to pick up a ball or other target object placed within the camera's field of view by the user.

Hence more generally, a robot platform may interact with a general purpose computer such as the Sony® PlayStation 4® to obtain a series of control signals relating to setting a state of the robot, for the purposes of control by a user and/or control by the PlayStation to achieve a predetermined task or goal. Optionally the state, task or goal may be at least in part defined within or in response to a virtual environment, and may make use of a simulation of the robot.

In embodiments of the disclosure, a robot platform such as the exemplary platforms 100 or 260 described previously herein may be used for the purposes of explanation, whilst it will be appreciated that any robot platform suited to the techniques and operations claimed herein below may be envisaged as being within the scope of the invention.

Figure 6A:
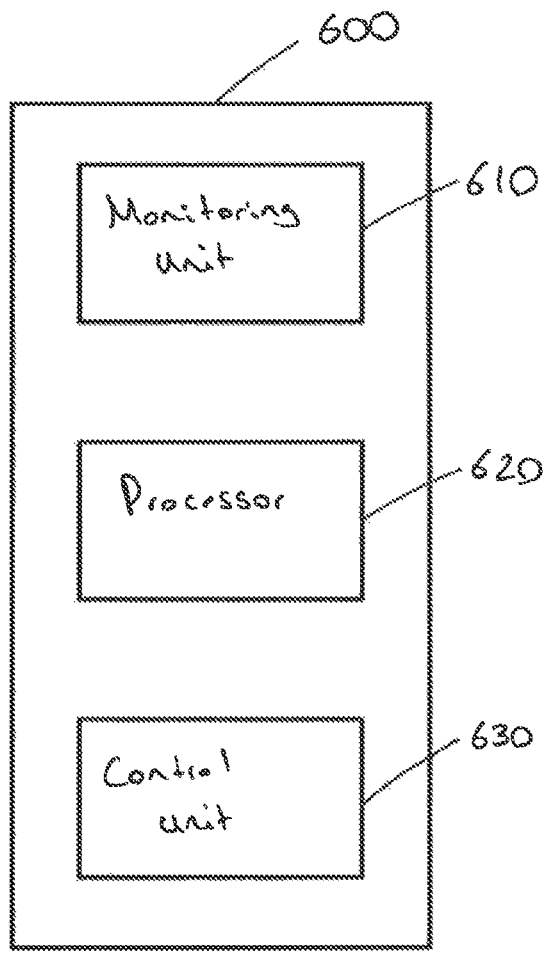
FIGS. 6A and 6B are schematic diagrams illustrating a configuration of an apparatus for controlling one or more operations performed by a robotic device in response to a status of a power source in accordance with embodiments of the invention.
Figure 6B:
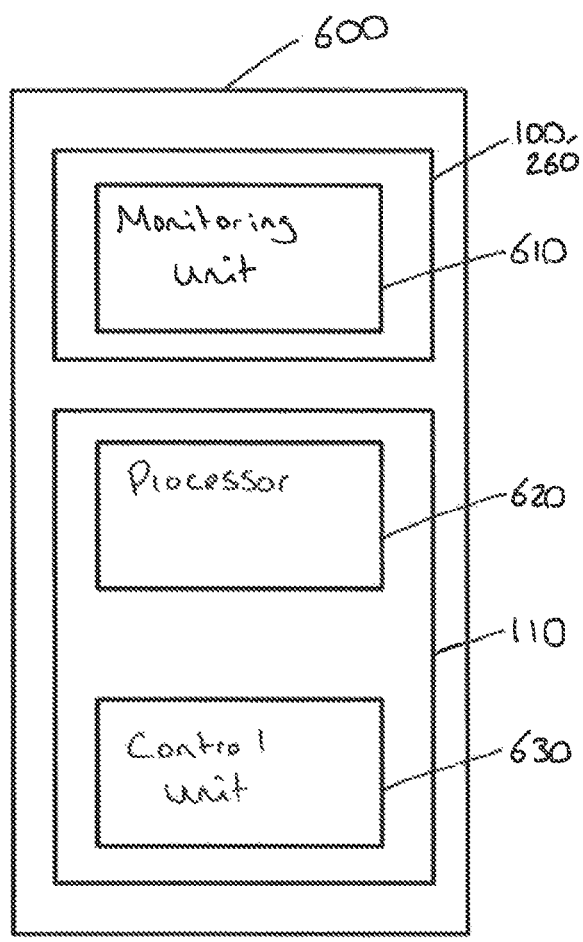

Referring now to FIGS. 6A and 6B, in embodiments of the disclosure an apparatus 600 for controlling one or more operations performed by a robotic device 100, 260 in response to a status of a power source comprises a monitoring unit 610 configured to monitor one or more parameters associated with the power source that provides power to the robotic device and to determine one or more performance indicators for the power source based on one or more of the parameters, a processor 620 configured to, under instruction of a program that defines a plurality of modes for one or more operations performed by the robotic device when reacting to a stimulus, assign one of the plurality of modes to an operation of the robotic device in response to one or more of the performance indicators for the power source, wherein an amount of energy required from the power source to perform the operation varies according to which mode is assigned to the operation, and a control unit 630 configured to control the robotic device to perform the operation in accordance with the mode assigned to the operation when reacting to the stimulus. The apparatus 600 may be provided as part of a robotic device 100, 260 or may be provided as part of a general purpose computer (such as 110) operating under suitable software instructions. In some cases, the monitoring unit 610 may be provided as part of the robotic device 100, 260, and the processor 620 and the control unit 630 may be provided as part of a general purpose computer (such as 110) operating under suitable software instructions, as illustrated in FIG. 6B. Other suitable combinations are considered in embodiments of the present disclosure. It will be appreciated that the robotic device may operate in a similar manner to the exemplary robot platforms 100 or 260, to any applicable extent appropriate to the techniques and operations claimed herein below.

In embodiments of the disclosure, the monitoring unit 610 comprises circuitry configured to receive one or more signals associated with the power source, and the monitoring unit 610 can monitor one or more parameters associated with the power source by measuring the properties of the one or more signals. The monitoring unit 610 may therefore monitor one or more parameters such as a voltage, a current, a capacitance, and a temperature associated with the power source in order to determine one or more performance indicators for the power source. The monitoring unit 610 can thus be configured to monitor at least one of a magnitude, a rate of change over a predetermined period of time, a frequency and a uniformity of the one or more parameters associated with the power source. The circuitry may comprise one or more signal processing units that can process the signals associated with the power source to measure one or more parameters associated with the power source. For example, a magnitude of a voltage (such as an open-circuit-voltage) can be measured, and changes in the voltage with respect to time can be monitored and used by the monitoring unit to determine one or more performance indicators (such as a state-of-charge for a battery, or a rate at which power is provided by a wireless charging apparatus) for the power source. Alternatively or in addition, a magnitude of a current and/or a capacitance associated with the power source can be measured and such parameters can be used to determine one or more performance indicators for the power source.

The monitoring unit 610 may comprise circuitry configured to measure a temperature of an environment in which the power source is situated such that changes in electrical properties that occur due to changes in temperature can be identified. The monitoring unit 610 can therefore monitor an environmental temperature associated with the power source and a relationship between the temperature and/or voltage and/or current and/or capacitance can be used to account for changes in temperature and accurately determine one or more performance indicators for the power source using the monitored parameters. The monitoring unit 610 can be configured to periodically receive the one or more signals associated with the power source and can periodically determine one or more performance indicators for the power source. Alternatively, the monitoring unit 610 may be configured to continuously receive the one or more signals.

In embodiments of the disclosure, the processor 620 is configured to, under instruction of the program that defines a plurality of modes for one or more operations performed by the robotic device when reacting to a stimuli, assign one mode of the plurality of modes to the operation of the robotic device in response to one or more of the performance indicators for the power source, wherein an amount of energy required from the power source to perform the operation varies according to which mode is assigned to the operation. The processor 620 may comprise a central processing unit (CPU) and a memory. The program defines a plurality of respective operational modes that can each be assigned to an operation of the robotic device 100, 260 in response to one or more of the performance indicators determined by the monitoring unit 610. A stimulus, such as a user input (e.g. using a handheld peripheral, speech input, gesture input, and/or gaze tracking) or a change in environmental lighting conditions detected by a camera for example, can cause a robotic device 100, 260 to perform one or more operations in response to the stimulus. As such, the robotic device 100, 260 may perform one or more predetermined operations when reacting to one or more stimuli, and an operational mode, which is defined by the program, can be assigned to any of the predetermined operations performed by the robotic device. For example, a transmitter of the robotic device may receive a signal corresponding to a user input instructing the robotic device to move in a first direction. The processor 620, under the instruction of the program, can assign one mode from the plurality of modes to the operation that moves the robotic device in the first direction, such that the control unit 630 controls the robotic device to perform the operation, which moves the robotic device in the first direction, in accordance with the mode assigned to the operation when the robotic device 100, 260 reacts to the stimulus. It will be appreciated that a stimulus that causes the robotic device to perform an operation can take many different forms, and the plurality of modes defined by the program can be assigned to any predetermined operation that is performed by the robotic device when reacting to such stimuli.

Hence more generally, the processor 620 can operate under the instruction of the program that defines the plurality of respective modes, and one mode can be assigned to an operation depending on the status of the power source so that the operation is performed by the robotic device in accordance with the assigned mode when reacting to a stimulus. In this way, for an operation performed by the robot when reacting to a stimulus, the processor 620 can be configured to assign one mode of the plurality of modes to the operation of the robotic device 100, 260 in response to the one or more performance indicators of the power source that indicate a status of the power source that provides power to the robotic device.

The program defines the plurality of respective operational modes that can be assigned to the one or more operations of the robotic device, and each mode of the plurality of modes corresponds to a different amount of energy expended when performing the same operation. In other words, for a first operation any one of the plurality of modes can be assigned to the operation so that a first amount of energy is expended when the first operation is performed in accordance with a first mode and a second amount of energy is expended when the first operation is performed in accordance with a second mode. The processor 620 can assign any mode from the plurality of modes to an operation in dependence upon one or more of the performance indicators for the power source, and an amount of energy required from the power source to perform the operation varies according to which mode is assigned to the operation. In this way, when the robotic device performs the operation in reaction to a stimulus, the robotic device can perform the operation in accordance with the assigned mode and the amount of energy used to perform the operation can thus be controlled according to the mode assigned to the operation. Therefore, a mode can be assigned to an operation according to a status of the power supply and the operation can be performed by the robotic device in accordance with the mode, which can advantageously allow energy to be conserved when the robotic device performs an operation when reacting to a stimulus.

In some examples, a first plurality of modes may be provided for a first operation of the robotic device and a second plurality of modes may be provided for a second operation of the robotic device, so that different modes can be provided for different operations performed by the robotic device when reacting to a stimulus. The processor 620 can be configured to assign one mode from the first plurality of modes to the first operation in response to one or more of the performance indicators and to assign one mode from the second plurality of modes to the second operation in response to one or more of the performance indicators.

The processor 620 may assign one mode to an operation in response to one or more of the performance indicators at a time T1, and in response to a change in one or more of the performance indicators the processor 620 can assign a different mode to the operation at a different time T2. In this way, the control unit 630 can control the robotic device 100, 260 to perform the operation in accordance with the mode assigned to the operation, and a manner in which a given operation is performed by the robotic device 100, 260 when reacting to a stimulus can be adapted in accordance with the status of the power source that provides power to the robotic device. For example, the monitoring unit 610 may monitor one or more of the parameters associated with the power source and at the time T1 the processor 620 may assign a first mode to an operation based on one or more of the performance indicators. At the time T2, a change in one or more of the parameters and thus one or more of the performance indicators may be identified by the monitoring unit 610, and in response to this change the processor 620 can assign a second mode to the operation. In other words, an operation of the robotic device can be performed by the robotic device in accordance with a mode assigned to the operation, and a mode assigned to the operation can vary depending on the properties of the power source that are indicated by one or more of the performance indicators identified by the monitoring unit 610.

The program may provide information for each respective operation that can be performed by the robotic device, including a predetermined amount of energy that is required to perform each operation under normal conditions. For example, for each operation the program may provide information representing an amount of energy (or an amount of charge in units of Amp-hrs) required for the operation. The predetermined amount of energy associated with an operation may be determined by the program based on measurements for previous instances when the operation was performed or based on factory setting information for the robotic device indicating power consumption of the operations under normal conditions. The program defines a plurality of modes for the one or more operations that can be performed by the robotic device and each mode corresponds to a different energy rating, which means that for a given operation an amount of energy that is required to perform the operation varies for the different modes.

For example, the plurality of modes may comprise three respective modes, where a first mode requires a first predetermined amount of power to perform the operation, a second mode requires a second predetermined amount of power to perform the operation, and a third mode requires a third predetermined amount of power to perform the operation. The program may indicate that a first operation requires 500 mAh (milli Amp hours) under normal conditions. In this case, the first mode may require 100 mAh to perform the operation, the second mode may require 300 mAh to perform the operation, and a third mode may require 500 mAh to perform the operation. In this case, the first mode may correspond to a low-power mode, the second mode may correspond to a medium-power mode and the third mode may correspond to a normal mode, in which the normal mode requires substantially the same amount of energy for the operation as that specified by the measurements for previous instances or the factory setting information. This means that for a given operation, one of the three modes can be assigned to the operation and the operation can be performed by the robotic device 100, 260 under the control of the control unit 630 such that the amount of energy expended when performing the operation can be controlled in accordance with the mode assigned to the operation.

In embodiments of the disclosure, the control unit 630 is configured to control the robotic device 100, 260 to perform the operation in accordance with the mode assigned to the operation. The control unit 630 may comprise a central processing unit (CPU) and a memory, and can control the operations of the robotic device 100, 260 using control signals. The control unit 630, 80 can be provided as part of the robotic device 100, 260 as illustrated in FIG. 4. Alternatively or in addition, the control unit 630 can be provided as part of another apparatus and control signals can be communicated to the robotic device 100, 260 via wireless or wired communication. The control unit 630 can control the robotic device 100, 260 to perform one or more operations in accordance with the mode assigned to the operation by the processor 620. It will be appreciated that any desired operation that the robotic device 100, 260 is capable of performing may be controlled by the control unit 630 in accordance with the mode assigned to the operation.

In embodiments of the disclosure, the one or more parameters monitored by the monitoring unit 610 comprise one or more from the list consisting of: a voltage; a current; a capacitance; and a temperature, wherein the monitoring unit 610 monitors at least one of a magnitude, a rate of change over a predetermined period of time, a frequency and a uniformity of the one or more parameters. For example, the monitoring unit 610 can be configured to periodically monitor a magnitude of a voltage associated with power source, and a state-of-charge (SoC) for the power source can be determined based on the power source's discharge voltage as a function of time (i.e. voltage based SoC estimation), wherein the state-of-charge represents the percentage of the maximum possible charge (or maximum battery capacity) that is present inside the battery. Alternatively or in addition, the monitoring unit 610 can be configured to periodically monitor a magnitude of a current associated with the power source and an integration of monitored current with respect to time can provide an indication of a total charge (i.e. number of coulombs) provided by the power source. In this way, the number of coulombs monitored by the monitoring unit 610 can be compared with the maximum capacity (ampere-hours) of the power source. Alternatively or in addition, the monitoring unit 610 may monitor a rate of change of the voltage over a predetermined period of time and determine a time ($T_{life}$) at which the power source will be unable to provide a predetermined amount energy to the robotic device. Alternatively or in addition, the monitoring unit 610 may monitor a capacitance associated with power source, and a state-of-charge (SoC) for the power source can be determined based on the monitored capacitance. For example, the measured capacitance (C) associated with the power source may provide an indication of an amount of charge stored (Q) and a voltage (V) associated with the battery ($Q=CV$) which can be used to determine the state-of-charge for the power source.

It will be appreciated that the monitoring unit 610 can be configured to monitor both a voltage and a current associated with the power source and can thus determine a state of charge for the power source based on a combination of these two parameters. In some cases, the monitoring unit 610 can be configured to monitor the temperature whilst monitoring the current and/or voltage such that variations in current and/or voltage due to changes in temperature can be identified rather than being attributed to changes in the properties of the power source. Hence more generally, the monitoring unit 610 can monitor one or more parameters associated with the power source and determine one or more performance indicators for the power source which can provide an indication of one or more current properties of the power source.

In embodiments of the disclosure, the power source, which provides power to the robotic device, comprises one or more from the list consisting of: one or more rechargeable batteries; and a charging apparatus for wireless charging of one or more rechargeable batteries. The one or more rechargeable batteries may include one or more lithium-ion batteries (LIB) or one or more lithium-ion polymer batteries that each comprise one or more cells. Other electrode materials such as nickel cadmium (NiCd), nickel-metal hydride (NiMH), or lead acid batteries may similarly be used. The one or more rechargeable batteries can be provided as part of a battery pack which is connected to the robotic device. The monitoring unit 610 may receive one or more electrical signals associated with a rechargeable battery and one or more parameters can be monitored for the battery in order to determine one or more performance indicators based on one or more of the parameters. When the monitoring unit 610 monitors one or more of the parameters associated with the battery, the monitoring unit 610 can be configured to determine one or more performance indicators for the battery which provide an indication of one or more properties from the list consisting of: a state of charge of the battery (i.e. the present charge stored by the battery as a percentage of the maximum possible charge that can be stored by the battery); a remaining period of time during which the battery is able to provide at least a predetermined amount energy; a rate of discharge of the battery for a predetermined period of time; and a maximum rate of discharge that can be sustained by the battery for a predetermined period of time.

For a rechargeable battery, the capacity of the battery (amp-hours) is representative of the total amount of charge that the battery can store ($Q=It$). When current is drawn from a fully charged battery, the output voltage of the battery will have an initial magnitude that may steadily decrease as more current is drawn, such that changes in the output voltage can be used to determine the remaining charge stored by the battery. The energy that can be provided by the rechargeable battery is dependent upon the capacity of the battery and the nominal voltage of the battery (Energy (watt-hours)=nominal voltage×capacity (amp-hours)), and may be expressed in units of watt-hours. A discharge rate can provide a measure of the rate at which a battery is discharged with respect to its capacity, and depending on the discharge rate the total energy that can be provided by the battery may vary. For a high discharge rate (large discharge current) the power delivered by the battery is high but the total amount of energy that can be provided by the battery is reduced. Conversely, for a low discharge rate (small discharge current) the power delivered by the battery is low but the total amount of energy that can be provided by the battery is increased. For example, a 1 Ah battery is capable of providing a 1 milli Amp discharge current for more than 1000 hours whereas if a discharge current of 100 milli Amps is drawn the battery will be discharged in less than 10 hours. For this reason the amount of current that can be drawn from a battery is often limited by the manufacturer in order to prevent excessive discharge currents that can damage the battery and/or significantly reduce the total energy that can be provided by the battery. As such a battery may have a maximum discharge current (e.g. maximum 30-second discharge current or maximum continuous discharge current), which is specified by the manufacturer in order to prevent damage from occurring and to prevent the battery from becoming exhausted prematurely.

In embodiments of the disclosure, the power source comprises a charging apparatus for wireless charging of one or more rechargeable batteries based on inductive charging techniques. The monitoring unit 610 can be configured to monitor one or more parameters associated with the charging apparatus and to determine one or more performance indicators for the charging apparatus, which can provide an indication of an amount of power transmitted by the charging apparatus that can be stored by one or more of the rechargeable batteries. The charging apparatus for wireless charging of one or more robotic devices 100, 260 comprises a power transmitting unit comprising one or more conducting wires each configured to carry an alternating current signal and to generate a time-varying magnetic flux when the conducting wire carries the alternating current signal. For example, the one or more conducting wires may each comprise a primary coil at a portion of a conducting wire. By providing a primary coil at a portion of a conducting wire it is possible to generate, for a given alternating current signal carried by the conducting wire, a greater magnetic flux at a localised region proximate to the primary coil. The position of the localised region of concentrated magnetic flux corresponds to the position of the portion of the conducting wire comprising the primary coil. As such, the primary coil can generate the time-varying magnetic flux when the conducting wire carries the alternating current signal.

The robotic device 100, 260 may comprise an induction coil that is electrically connected to one or more rechargeable batteries such that the one or more batteries can be charged when the induction coil is within a predetermined distance of the power transmitting unit of the charging apparatus. When the induction coil of the robotic device 100, 260 is within a predetermined distance of the primary coil of the charging apparatus, the time-varying magnetic flux generated by the primary coil will induce an electromotive force in the induction coil. Consequently, the primary coil of the charging apparatus can be used to wirelessly transmit power to the induction coil when an alternating current signal is supplied to the conducting wire comprising the primary coil. In this way, power can thus be transmitted from the charging apparatus to the robotic device and stored by one or more of the rechargeable batteries.

Figure 7:
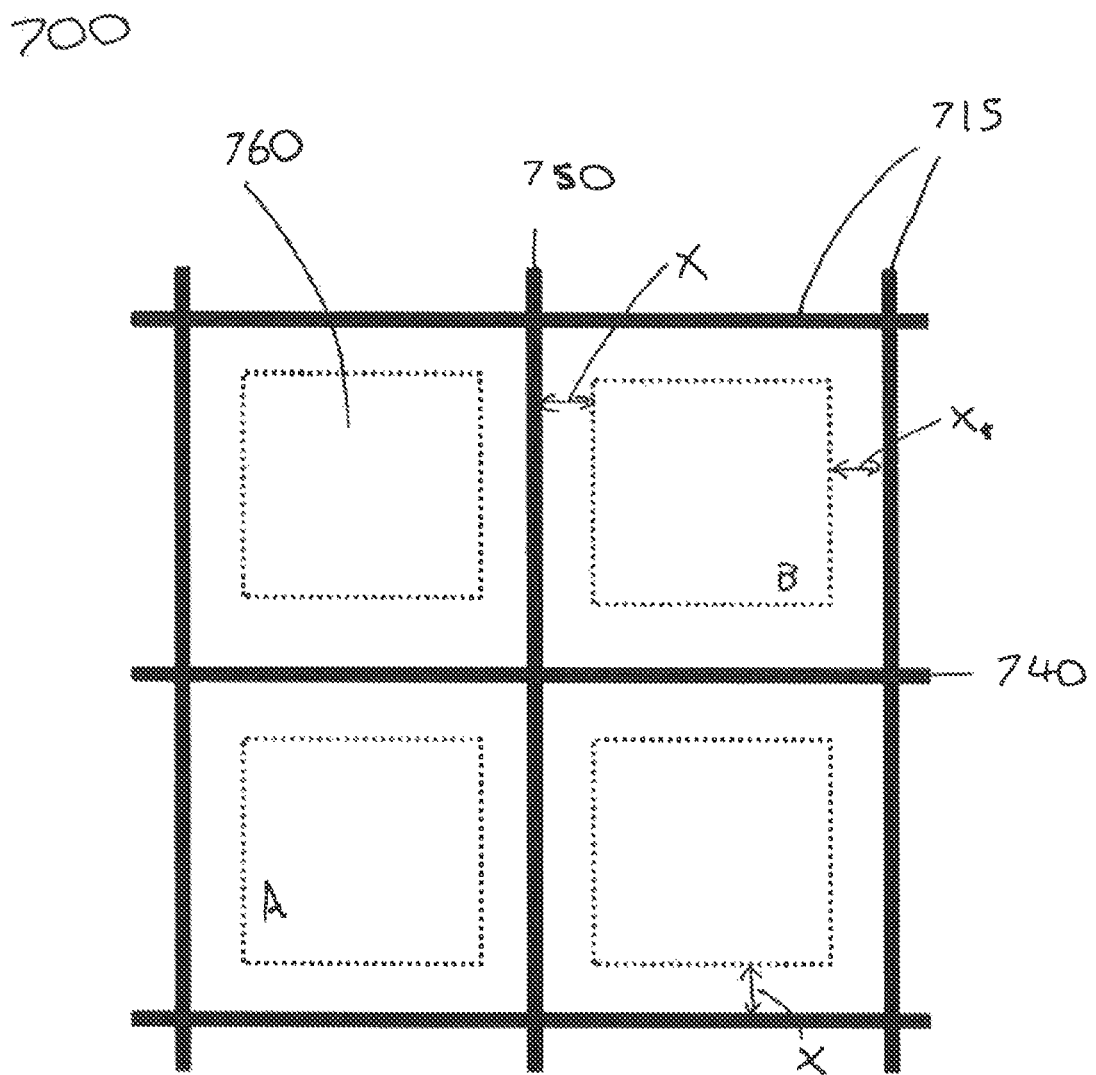
FIG. 7 is a schematic diagram illustrating monitoring parameters associated with a charging apparatus for wireless charging of one or more rechargeable batteries.

The monitoring unit 610 can be configured to monitor one or more of the parameters associated with the charging apparatus and to determine one or more performance indicators for the power source which can provide an indication of one or more current properties of the power source. FIG. 7 is a diagram schematically illustrating monitoring the presence or the absence of the induction coil of the robotic device 100, 260 within the predetermined distance of a plurality of conducting wires 715 of the charging apparatus 700 comprising a conducting wire 740 extending in a first direction and a conducting wire 750 extending in a second direction. The plurality of conducting wires 715 are arranged so that at least one conducting wire 740 extends in the first direction and at least one conducting wire 750 extends in the second direction. The first direction and the second direction can form a two-dimensional plane as illustrated, such that the plurality of conducting wires 715 of the power transmitting unit 610 extend in the first direction and the second direction on substantially the same two-dimensional plane defined by the first direction and the second direction.

A horizontal distance X on the two-dimensional plane defined by the first direction and the second direction is shown, and the techniques discussed assume that the robotic device 100, 260 is maneuverable in the two-dimensional plane defined by the first direction and the second direction, but the vertical distance Z (in the direction out of the page) between the induction coil of the robotic device 100, 260 and the plurality of wires does not vary as the robotic device is maneuvered (for example, the vertical distance from the induction coil to the two dimensional plane may be anywhere within the range of 0.5-40 cm). For example, the conducting wires 715 may be arranged in the two-dimensional plane and the robotic device 100, 260 may move from position A to position B, as shown in FIG. 7 by driving one or more actuators. Therefore, in the following techniques, when the induction coil of the robotic device 100, 260 is moved to within the predetermined distance of the conducting wire, this is due to movement of the robotic device in the two-dimensional plane defined by the first direction and the second direction whilst the vertical distance Z between the induction coil and the two-dimensional plane remains unchanged. Therefore, assuming that the vertical height Z of the indication coil with respect to the two-dimensional plane remains unchanged, references to the term predetermined distance refer to the distance X illustrated in FIG. 7. It will be appreciated that the distance of the induction coil from a conducting wire may be calculated using standard trigonometric calculations (distance$^2$=X$^2$+Z$^2$).

By analysing the properties of the alternating current signal carried by the conducting wires 740, 750, the presence of the induction coil of the robotic device 100, 260 within the horizontal distance X of the conducting wire 740, 750 may be detected. When the induction coil of the robot is moved from a position within the region 760 to a position within the distance X from the conducting wire 740, 750, an analysis of the alternating current signal carried by each conducting wire 740, 750 can be used to identify the presence of the induction coil within the distance X of that conducting wire 740, 750. When the induction coil of the robotic device 100, 260 is moved to be proximate to the conducting wire, the magnetic flux generated due to the alternating current carried by the conducting wire will induce an electromotive force in the induction coil, and this coupling between the conducting wire and the induction coil can alter (perturb) the electrical characteristics of the conducting wire when proximate to the induction coil. In some examples, the alteration (perturbation) of the electrical characteristics of the conducting wire, when the induction coil is moved to within the predetermined distance X, can cause a change in one or more properties of the alternating current signal carried by the conducting wire (e.g. signal amplitude, frequency and/or phase) which can be monitored by the monitoring unit 610 to provide one or more performance indicators that can indicate the presence or the absence of the induction coil within the predetermined distance X of the charging apparatus 700.

In other words, the electrical characteristics of the charging apparatus 700 may be different when the induction coil is proximate to the conducting wires 715 and harvesting power from the conducting wire, in comparison to when the induction coil is not proximate to the conducting wire. The change in the electrical characteristics can yield a change in the alternating current signal carried by the conducting wire which can be monitored in order to determine the presence or the absence of the induction coil within the predetermined distance. In some examples, changes in the voltage appearing across a conducting wire and/or a change in current flow may be indicative of the presence or the absence of the induction coil within the predetermined distance X of the conducting wire.

Alternatively or in addition, the robotic device 100, 260 may be configured to periodically modify its inductive load, using one or more switches (or an array of switches), which can cause a periodic variation in the electromotive force, and thus the current, induced in the induction coil of the robotic device 100, 260. In this way, the monitoring unit 610 can monitor the respective alternating current signals carried by the conducting wires 740, 750 and detect a periodic variation in an alternating current signal that is characteristic of the periodic modification of the load of the induction coil of the robotic device (i.e. detect a time-dependent property of a signal that is characteristic of the robotic device 100, 260). As such, the presence of the induction coil of the robotic device 100, 260 within the predetermined distance X can be determined by the monitoring unit 610 based on whether or not a periodic variation of the alternating current signal carried by a conducting wire is measured which corresponds to the periodic modification of the load of the induction coil, the periodic variation serving to signify the presence of the robotic device 100, 260.

For example, the monitoring unit 610 can be configured to monitor at least one of a magnitude, a frequency and a phase of a voltage, a current and/or a capacitance associated with the charging apparatus 700. Hence the monitoring unit 610 can determine one or more performance indicators for the power source indicating one or more from the list consisting of: a presence or an absence of the induction coil of the robotic device 100, 260 within the predetermined distance of the charging apparatus; and a rate at which energy is transmitted to the robotic device 100, 260 (i.e. an amount of power transmitted from the charging apparatus that is received by the robotic device). When the induction coil of the robotic device 100, 260 is moved from a position within the region 760 to a position within the predetermined distance from the conducting wire 740, 750, the coupling between the conducting wire and the induction coil can alter (perturb) the electrical characteristics of the conducting wire and the electrical characteristics can be monitored to determine a status of the charging apparatus 700.

In embodiments of the disclosure, the processor 620 is configured to assign a mode from the plurality of modes to the operation in dependence upon a comparison of one or more of the performance indicators with one or more predetermined threshold conditions. The program may provide information for one or more predetermined threshold conditions and the processor 620 can be configured to, under instruction of the program, compare one or more of the performance indicators with one or more of the predetermined threshold conditions. Therefore, a mode from the plurality of modes can be assigned to an operation depending on whether one of the predetermined threshold conditions is satisfied. The processor 620 can thus assign a first mode to an operation when a threshold condition is satisfied, and a second mode can be assigned to the operation when another threshold condition is satisfied. Alternatively, in some cases one threshold condition can be compared with one or more of the performance indicators and one of two modes can be assigned depending whether or not the threshold condition is satisfied.

It will be appreciated that there may be a number of respective threshold conditions and a different mode can be assigned to a given operation for each threshold condition. For example, the performance indicator that indicates a state of charge of the battery may be compared with a threshold condition to establish whether the present charge stored by the battery is less than or greater than 50% of the maximum possible charge that can be stored by the battery. In dependence upon the comparison, the processor 620 can be configured to assign either a first mode or a second mode the operation, wherein an amount of energy required to perform the operation in accordance with the second mode is greater than an amount of energy required to perform the operation in accordance with the first mode. Alternatively or in addition the performance indicator that indicates a state of charge of the battery may be compared with a first predetermined threshold condition and a second predetermined threshold condition to establish whether the present charge stored by the battery is within the range 31%-60% (first predetermined threshold condition) or 1%-30% (second predetermined threshold condition) of the maximum possible charge that can be stored by the battery. In this case, the first mode can be assigned to the operation when the second threshold condition satisfied, the second mode can be assigned to the operation when the first threshold condition is satisfied, and a third mode can be assigned when neither of these conditions are satisfied. In this example, the first mode corresponds to a low-power mode the second mode corresponds to a medium-power mode and the third corresponds to a normal-power mode. Hence the control unit 630 can control the robotic device to perform the operation in accordance with the mode such that an amount of energy drawn from the power source when performing the operation can be controlled. It will be appreciated that a greater number of respective threshold conditions may be provided and similarly a greater number of respective modes may be provided.

Similarly the performance indicator that indicates the remaining period of time during which the battery is able to provide at least a predetermined amount energy may be compared with one or more of the predetermined threshold conditions in a manner similar to that described for the performance indicator indicating the state of charge of the battery. Therefore, one mode from the plurality of modes may be assigned to the operation depending upon the comparison of the remaining period of time during which the battery is able to provide at least predetermined amount energy with respect to the one or more predetermined threshold conditions. Consequently, in some cases a first performance indicator may be compared with the predetermined threshold conditions and a second performance indicator may be compared with the predetermined threshold conditions and a weighting may be applied to each performance indicator in order to assign one mode from the plurality of modes in dependence upon the plurality of performance indicators. For example, when the first performance indicator corresponds to a threshold condition that causes the processor 620 to assign a second mode to the operation, and the second performance indicator corresponds to a threshold condition that causes the processor 620 to assign a first mode to the operation, the processor can be configured to assign one of the modes to the operation in dependence upon a weighting of the performance indicators. Therefore, if a greater weighting is given to the first performance indicator, then in this case the processor can be configured to assign the second mode to the operation.

In embodiments of the disclosure, the processor 620 can be configured to assign the mode to the operation in dependence upon an amount of energy required to perform the operation in accordance with the mode. As discussed previously, the processor 620, under the instruction of the program, can assign a mode to an operation in dependence upon a comparison of one or more performance indicators with one or more predetermined threshold conditions. The processor 620 can be configured to determine an amount of energy required to perform the operation in accordance with the mode, and the processor 620 may thus assign a mode to the operation in dependence upon the energy required to perform the operation in accordance with the mode. If the amount of energy required to perform an operation in accordance with an assigned mode exceeds a predetermined amount of energy, then the processor 620 can be configured to assign a different mode to the operation in order to reduce the amount of energy required to perform the operation.

For example, the processor 620 may initially assign the second mode to a first operation based on one or more performance indicators and may assign the second mode to a second operation based on the one or more performance indicators. The processor 620 can determine an amount of energy required to perform the first operation in accordance with the second mode and an amount of energy required to perform the second operation in accordance with the second mode. If the amount of energy required to perform either operation in accordance with the second mode exceeds a predetermined amount of energy then the processor can be configured to assign the first mode (lower power mode than the second mode) to the operation in order to reduce the energy drawn from the power source when performing the operation. Therefore, the processor can assign a mode to an operation in dependence upon an amount of energy required by the operation so that operations which require larger amounts of energy (e.g. driving an actuator of a robotic device), which exceed a predetermined threshold, can be performed in a mode requiring less energy from the power source. In this way, operations that require large amounts of energy from the power source, which exceed the predetermined amount of energy, can be assigned a mode that limits the energy required from the power source to be less than a predetermined amount of energy. Therefore, large discharge currents, which can severely shorten battery life, can be prevented from occurring.

In embodiments of the disclosure, when one or more of the performance indicators of the power source correspond to a first predetermined threshold condition the processor 620 is configured to assign the first mode (low-power mode) to one or more secondary operations and to assign the second mode (medium-power mode) to one or more primary operations. The program can provide information for each respective operation that can be performed by the robotic device and each operation can be classified as either a primary operation or a secondary operation. It will be appreciated that operations may be classified using a larger number of respective classes. Therefore, the one or more operations of the robotic device 100, 260 can be classified and the processor 620 can assign a mode to each of the one or more operations according to their classification. For example, one or more of the performance indicators can be compared with one or more threshold conditions and when the first predetermined threshold condition is satisfied the processor can assign the second mode to the one or more operations classified as primary operations and can assign the first mode to the one or more operations classified as secondary operations. For example, the first threshold condition may indicate that the present charge stored by the battery is within the range 31%-60% of the maximum possible charge that can be stored by the battery, or may indicate that the remaining period of time during which the battery is able to provide at least a predetermined amount energy is less than a predetermined period of time such as 60 minutes (it will be appreciated that other values may be used for the first threshold condition, and the first threshold condition and second threshold condition use different values). In this way, the control unit 630 can control the robotic device 100, 260 to perform the secondary operations in accordance with the first mode which requires a smaller amount of energy than when the secondary operations are performed in the second mode. Therefore, primary operations can be preformed in accordance with the second mode and primary operations can be prioritised over secondary operations, by allowing primary operations to draw more energy from the power source than secondary operations.

In embodiments of the disclosure, an operation is classified as either a primary operation or a secondary operation in dependence upon whether the operation corresponds to a movement of the robotic device 100, 260. Primary operations are those operations that result in a movement of the robotic device 100, 260 by controlling one or more actuators of the robotic device 100, 260. For example, primary operations may include operations that cause the robotic device 100, 260 to adjust at least one of a position, an orientation, a pose, and an arm or leg position. Conversely, secondary operations are those operations that do not result in a movement of the robotic device 100, 260. Secondary operations may be performed by the robotic device 100, 260 when the control unit 630 controls one or more from the list consisting of: a light emitting device of the robotic device; an audio emitting device of the robotic device; a haptic feedback device of the robotic device; a camera of the robotic device; and a transmitter of the robotic device. This means that a mode can be assigned to an operation depending on the type of the operation, and operations corresponding to a movement of the robotic device can be performed in a higher-power mode than operations that do not correspond to a movement of the robotic device. Hence, operations considered to be of secondary importance to the functioning of the robotic device can be performed in a lower-power mode than operations considered to be or primary importance. Consequently, the robotic device can perform its primary functions whilst reducing the amount of energy drawn from the battery for performing secondary operations.

In embodiments of the disclosure, the number of respective modes provided for the primary operation is greater than the number of respective modes provided for the secondary operation. As discussed previously, the processor 620 can assign one of a plurality of modes to an operation of the robotic device 100, 260 in response to one or more of the performance indicators for the power source. The number of respective modes that can possibly be assigned to the operation varies depending on whether an operation is classified as a primary operation or a secondary operation. For example, X respective modes from the plurality of modes may be capable of being assigned to a primary operation, whereas Y respective modes from the plurality of modes may be capable of being assigned to a secondary operation, where X is greater than Y. In other words, a primary operation can be performed in accordance one mode that is selected from X respective modes and a secondary operation can be performed in accordance with one mode that is selected from Y respective modes.

In some examples, three respective modes may be provided for the primary operations and two respective modes may be provided for the secondary operations. Therefore, a greater number of respective modes can be provided for primary operations, which allows the amount of energy expended when performing primary operations to be controlled with greater accuracy. Hence the processor 620 can assign a mode to a primary operation with a greater granularity than that provided for a secondary operation, thereby providing a greater level of control for an amount of energy required when performing primary operations. In other words, a first operation may have a first number of respective modes that can be assigned to the operation when the operation is a primary operation, and a second number of respective modes that can be assigned to the operation when the operation is a secondary operation. For example, an operation that requires 500 mAh (milli Amp hours) under normal conditions may have five respective modes when the operation is a primary operation, wherein the respective modes require 100 mAh, 200 mAh, 300 mAh, 400 mAh or 500 mAh to perform the operation in accordance with each mode. Conversely, when the operation is a secondary operation, there may be two respective modes for the operation which require 100 mAh or 500 mAh to perform the operation in accordance with each mode.

In embodiments of the disclosure, when one or more of the performance indicators of the power source correspond to the second predetermined threshold condition the processor 620 can be configured to assign the first mode to one or more of the primary operations. For example, whereas the first predetermined threshold condition may indicate that the present charge stored by the battery is within the range 31%-60% (or alternatively some other range such as 25%-50%), the second predetermined threshold condition may indicate that the present charge stored by the battery is within the range 1%-30% (or alternatively some other range such as 1%-25%). Alternatively or in addition, the first predetermined threshold and the second predetermined threshold may indicate that the remaining period of time during which the battery is able to provide at least predetermined amount energy is within the range 0.5-1 hours or 0.01-0.49 hours, respectively. If the one or more performance indicators indicate that the first threshold condition is satisfied, then as discussed previously the processor 620 can assign the second mode to an operation classified as a primary operation. However, if the one or more performance indicators correspond to the second threshold condition then the processor 620 can instead assign the first mode to the operation classified as the primary operation. Therefore, when the second threshold condition is satisfied the primary operations of the robotic device can be controlled in accordance with the first mode and the amount of energy drawn from the battery for performing the primary operations can be reduced.

In embodiments of the disclosure, when the first mode is assigned to one or more primary operations the control unit 630 is configured to control the robotic device 100, 260 to perform the one or more primary operations in accordance with the first mode so that the one or more primary operations are performed in sequence rather than in parallel when reacting to the stimulus. This means that when reacting to a stimulus, such as a user input for controlling the robotic device 100, 260 to turn and move in a first direction, the control unit 630 can control the robotic device to perform a turning operation and then perform an operation to move the robotic device in the first direction. As such, when the performance indicators satisfy the second predetermined threshold condition, the first mode can be assigned to the one or more primary operations and the robotic device can perform the operations in sequence to reduce the magnitude of the discharge current drawn from the power source at any given time (i.e. reduce an instantaneous load on the power source). When performing two primary operations in parallel, a discharge current with a first magnitude may be required to power the two operations simultaneously, whereas when performing two primary operations in sequence a discharge current with a second magnitude, which is smaller than the first magnitude, can be drawn to sequentially power the respective operations. Therefore, by performing the operations sequentially it is possible to prevent large discharge currents from being drawn from the power source which can prolong the time period for which the power source is able to provide energy to the robotic device suitable for performing operations.

In embodiments of the disclosure, the one or more primary operations are performed in sequence according to a schedule and an ordering of the primary operations in the schedule is determined based on a priority level associated with each primary operation. For example, the robotic device 100, 260 may react to a stimulus that causes the robotic device to perform operations in order to move from a position A to a position B. In this case, the operations may comprise a turning operation that changes the orientation of the robotic device, and a moving operation that changes the position of the robotic device. The program can provide information for each respective operation that can be performed by the robotic device, such that each operation may have an associated classification and priority level. The priority level associated with each operation can be used to determine an order in which the respective operations are to be performed such the higher priority operations can be performed before the lower priority operations. Therefore, when reacting to a stimulus that causes the robotic device to move from position A to position B, the operations to be performed by the robotic device 100, 260 can be ordered in a schedule according to their priority level and the control unit 630 can control the robotic device 100, 260 to perform the operations in the order that is defined by the schedule.

In embodiments of the disclosure, when one or more of the performance indicators of the power source correspond to the second predetermined threshold condition the processor 620 is configured to assign the first mode to one or more primary operations corresponding to motion of the robotic device that does not adjust at least one of a position and an orientation of the robotic device and to assign the second mode to one or more primary operations corresponding to an adjustment in at least one of the position and the orientation of the robotic device. The first mode can be assigned to one or more primary operations such as arm, head or torso movements of the robotic device 100, 260 which do not contribute to adjusting the position and/or orientation of the robotic device 100, 260. This means that primary operations that result in movement of the robotic device 100, 260 without changing the position and/or the orientation of the robotic device 100, 260 can be performed by the robotic device in accordance with the first mode and therefore a smaller amount of energy can be provided by the power source for performing such primary operations. Conversely, the second mode can be assigned to one or more primary operations such as lower limb (leg), foot or wheel movements which do contribute to adjusting the position and/or orientation of the robotic device 100, 260. Therefore, the operations that do not cause the robotic device to adjust its position and/or orientation can be performed in accordance with the first mode and thus smaller amounts of energy can be provided by the power source for performing these operations, whilst operations that adjust the position and/or orientation can be performed in accordance with the second mode. Therefore, primary operations that can allow the robotic device to move towards a charging station can be prioritised over other primary operations that do not assist in moving the robotic device towards the charging station, by allowing primary operations that facilitate movement to draw greater amounts of energy from the power source.

In embodiments of the disclosure, when one or more of the performance indicators of the power source correspond to a third predetermined threshold condition the control unit 630 is configured to control the robotic device 100, 260 to perform an operation in which one or more rechargeable batteries of the power source are detached from the robotic device. The third predetermined threshold condition may be compared with the one or more performance indicators and may provide an indication as to whether the present charge stored by the battery is within a predetermined range (such as 0%-1%) or whether the remaining period of time during which the battery is able to provide at least predetermined amount energy is within the range 0.00-0.0.05 hours. When one or more of the performance indicators correspond to the third threshold condition the control unit 630 can be configured to control the robotic device 100, 260 to disconnect one or more of its rechargeable batteries that have one or more performance indicators that satisfy the third predetermined threshold condition. This means that the robotic device 100, 260 can be controlled to discard one or more rechargeable batteries that have been exhausted and are redundant, so that the total mass of the robotic device 100, 260 can be reduced. Hence the mass of the robotic device can be reduced by discarding the one or more rechargeable batteries that can no longer be used to provide power for performing operations, and this can assist the robotic device 100, 260 in saving energy (i.e. reducing energy drawn from the power source) when adjusting its position and/or orientation.

In embodiments of the disclosure, the processor 620 is configured to predict a rate of change of one or more of the performance indicators of the power source and to assign one of the plurality of modes to the operation of the robotic device in response to one or more of the predicted performance indicators. The one or more performance indicators monitored by the monitoring unit 610 can be analysed by the processor 620 so as to predict a rate of change for one or more of the performance indicators. For example, the processor 620 can analyse a magnitude and/or a rate of change of a performance indicator at a plurality of respective times (e.g. T1 and T2) and may predict an expected value and/or expected rate of change for the performance indicator at a future time based on the properties of the performance indicator measured by the monitoring unit 610 at the plurality of respective times. In this way, the processor 620 can predict a magnitude for the performance indicator at a time T3 (where T3 occurs later in time than T1 and T2). Therefore, a magnitude of a performance indicator can be predicted in advance and a mode can be assigned to one or more operations based on a comparison of one or more predicted performance indicators with one or more of the predetermined thresholds. In this way, the processor 620 can predict one or more performance indicators in advance based on a previously monitored status of the power source. As such, a prediction can be made for a remaining period of time during which the battery is able to provide at least a predetermined amount energy (i.e. a prediction can be made as to when the power source will be unable to provide at least the predetermined amount energy) based on an predictions using an extrapolation calculation, and modes can be assigned to respective operations in a pre-emptive manner to control the energy required from the power source. In some examples, the extrapolation calculation may be performed based on a linear extrapolation of the monitored parameters. Alternatively or in addition, the extrapolation calculation may be performed to account for non-linarites in performance of rechargeable batteries by considering manufacturer specifications or parameters monitored for previous instances where one or more of the rechargeable batteries were discharged.

Figure 8:
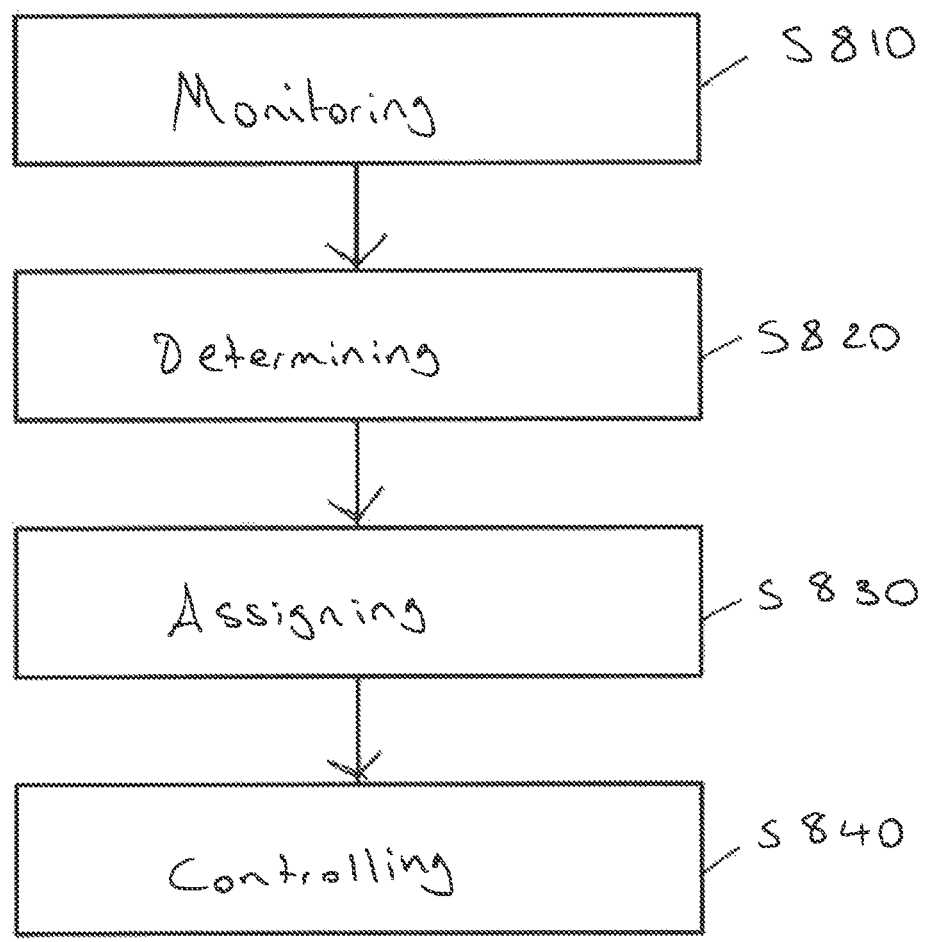
FIG. 8 is a flow diagram of a method of controlling one or more operations performed by a robotic device in response to a status of a power source.

Referring now to FIG. 8, in embodiments of the disclosure a method of controlling one or more operations performed by a robotic device in response to a status of a power source, comprises:

a first step S810 of monitoring one or more parameters associated with the power source that provides power to the robotic device;

a second step S820 of determining one or more performance indicators for the power source based on one or more of the parameters;

a third step S830 of assigning, under instruction of a program that defines a plurality of modes for one or more operations performed by the robotic device when reacting to a stimulus, one of the plurality of modes to an operation of the robotic device in response to one or more of the performance indicators for the power source, wherein an amount of energy required from the power source to perform the operation varies according to which mode is assigned to the operation; and a fourth step S840 of controlling the robotic device to perform the operation in accordance with the mode assigned to the operation when reacting to the stimulus.

It will be apparent to a person skilled in the art that variations in the above method corresponding to operation of the various embodiments of the system as described and claimed herein are considered within the scope of the present invention.

In a further embodiment of the present invention, an authoring tool is provided to generate a plurality of modes for one or more operations performed by the robotic device when reacting to a stimulus. This authoring tool may be part of a more general tool provided to script behaviour and otherwise develop capabilities for a robot.

The authoring tool may obtain information about the costs of performing one or more actions (such as a full rotation of an actuator, or illuminating a light for 1 second). These may be supplied by the maker of the robot, the current user of the authoring tool, built into the tool, and/or calculated based on other parameter of the robot, as applicable. The costs may be expressed in a plurality of ways, such as instantaneous power requirement, overall energy consumption, percentage of standard battery reserve/life, or the like.

A developer may then script a response to a stimulus for the robot that may include a plurality of actions in sequence and/or in parallel, and the authoring tool may estimate the cost of that response, in terms or one or more of instantaneous power consumption during the response, total energy consumption, or the like. The authoring tool may optionally classify the response as a high cost, low cost or optionally medium cost response (e.g. in accordance with one or more threshold conditions as described previously). If the cost is high, or optionally medium, then the user may then chose (or be required by the authoring tool) to create a lower-cost response. This lower cost response may omit or substitute actions to lower overall energy consumption, and/or omit, substitute or sequence parallel actions to lower instantaneous power consumption. The authoring tool may then output the two, three or more responses, together with their cost classification, threshold and/or cost values, to the robot; typically as part of a wider control or scripting package.

Figure 9:
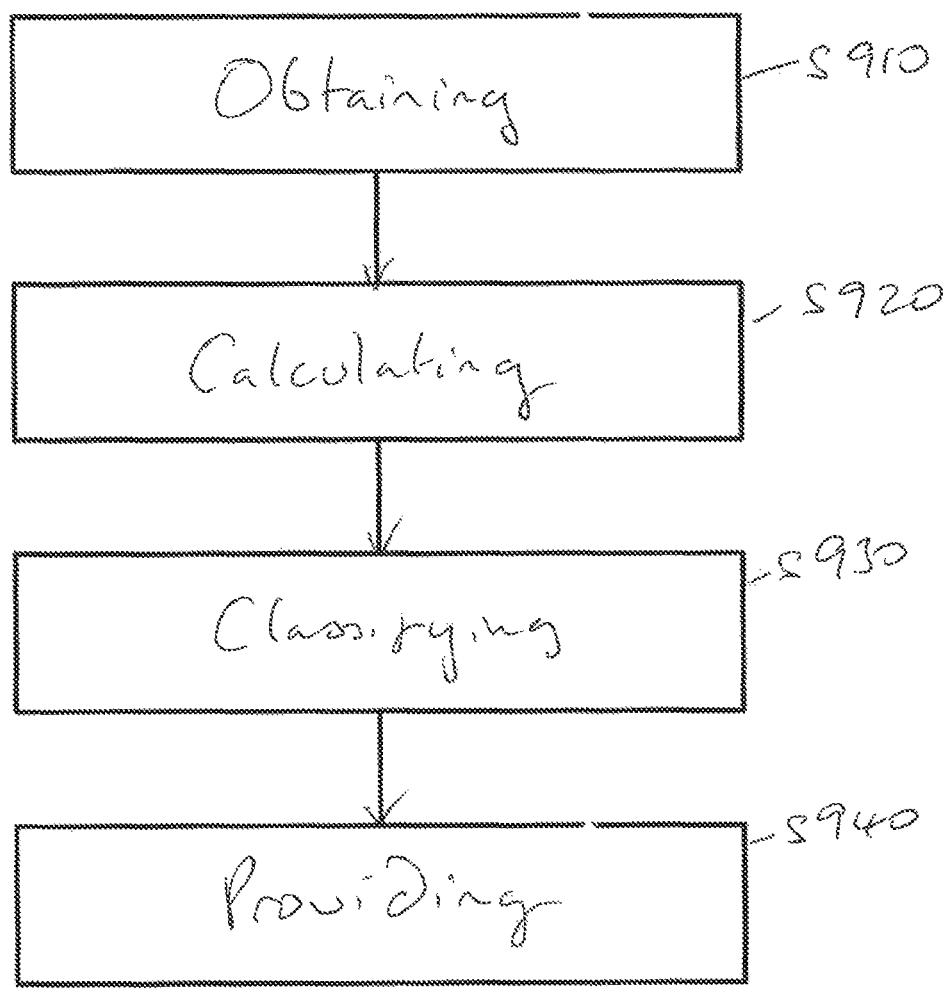
FIG. 9 is a flow diagram of a method of controlling one or more operations performed by a robotic device in response to a status of a power source.

Hence, referring now also to FIG. 9, in an embodiment of the present invention, a method for controlling one or more operations performed by a robotic device comprises:

in a first step s910, obtaining energy costs energy consumption, instantaneous power, or the like) for a plurality of actions of the robotic device, as described previously;

in a second step s920, calculating an energy cost for each of a plurality of modes for one or more operations, respectively comprising one or more of the plurality of actions, performed by the robotic device when reacting to a stimulus, as described previously;

in a third step s930, classifying these modes responsive to the energy cost (e.g. in accordance with one or more threshold conditions as described previously); and in a fourth step s940, providing the modes and classifications to the robotic device, so that it can select an energy-appropriate response to a given stimulus.

It will also be appreciated that example embodiments can be implemented by computer software operating on a general purpose computing system such as a games machine or a computing system provided as part of a robotic device. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for controlling one or more operations performed by a robotic device in response to a status of a power source, comprising:
   a monitoring unit configured to monitor one or more parameters associated with the power source that provides power to the robotic device and to determine one or more performance indicators for the power source based on one or more of the parameters;
   a processor configured to, under instruction of a program that defines a plurality of modes for one or more operations performed by the robotic device when reacting to a stimulus, assign one of the plurality of modes to an operation of the robotic device in response to one or more of the performance indicators for the power source, wherein an amount of energy required from the power source to perform the operation varies according to which mode is assigned to the operation; and
   a control unit configured to control the robotic device to perform the operation in accordance with the mode assigned to the operation when reacting to the stimulus, wherein:
   when one or more of the performance indicators of the power source correspond to a first predetermined threshold condition, the processor is configured to assign a first mode to one or more secondary operations, which secondary operations are operations that do not result in a movement of the robotic device, and to assign a second mode to one or more primary operations, which primary operations are operations that do result in a movement of the robotic device, and an amount of energy required to perform an operation in accordance with the second mode is greater than the amount of energy required to perform the same operation in accordance with the first mode.

2. An apparatus according to claim 1, wherein the processor is configured to assign the mode to the operation in dependence upon a comparison of one or more of the performance indicators with one or more predetermined threshold conditions.

3. An apparatus according to claim 2, wherein the processor is configured to assign the mode to the operation in dependence upon an amount of energy required to perform the operation in accordance with the mode.

4. An apparatus according to claim 1, wherein the number of respective modes provided for the primary operation is greater than the number of respective modes provided for the secondary operation.

5. An apparatus according to claim 1, wherein when one or more of the performance indicators of the power source correspond to a second predetermined threshold condition the processor is configured to assign the first mode to one or more of the primary operations.

6. An apparatus according to claim 5, wherein the control unit is configured to control the robotic device to perform the one or more primary operations in accordance with the first mode so that the one or more primary operations are performed in sequence rather than in parallel when reacting to the stimulus.

7. An apparatus according to claim 1, wherein when one or more of the performance indicators of the power source correspond to a second predetermined threshold condition the processor is configured to assign a first mode to one or more primary operations corresponding to motion of the robotic device that does not adjust at least one of a position and an orientation of the robotic device and to assign a second mode to one or more primary operations corresponding to an adjustment in at least one of the position and the orientation of the robotic device.

8. An apparatus according to claim 1, wherein the control unit is configured to control the robotic device to perform the operation in accordance with the mode assigned to the operation by controlling one or more from the list consisting of:
   an actuator of the robotic device;
   a light emitting device of the robotic device;
   an audio emitting device of the robotic device;
   a haptic feedback device of the robotic device;
   a camera of the robotic device; and
   a transmitter of the robotic device.

9. An apparatus according to claim 1, wherein the one or more parameters associated with the power source comprise one or more from the list consisting of:
   a voltage;
   a current;
   a capacitance; and
   a temperature, wherein the monitoring unit monitors at least one of a magnitude, a rate of change over a predetermined period of time, a frequency and a uniformity of the one or more parameters.

10. An apparatus according to claim 1, wherein the processor is configured to predict a rate of change of one or more of the performance indicators of the power source and to assign one of the plurality of modes to the operation of the robotic device in response to one or more of the predicted performance indicators.

11. A method of controlling one or more operations performed by a robotic device in response to a status of a power source, comprising:

monitoring one or more parameters associated with the power source that provides power to the robotic device;

determining one or more performance indicators for the power source based on one or more of the parameters;

assigning, under instruction of a program that defines a plurality of modes for one or more operations performed by the robotic device when reacting to a stimulus, one of the plurality of modes to an operation of the robotic device in response to one or more of the performance indicators for the power source, wherein an amount of energy required from the power source to perform the operation varies according to which mode is assigned to the operation; and controlling the robotic device to perform the operation in accordance with the mode assigned to the operation when reacting to the stimulus, wherein:

when one or more of the performance indicators of the power source correspond to a first predetermined threshold condition, the assigning includes assigning a first mode to one or more secondary operations, which secondary operations are operations that do not result in a movement of the robotic device, and assigning a second mode to one or more primary operations, which primary operations are operations that do result in a movement of the robotic device, and an amount of energy required to perform an operation in accordance with the second mode is greater than the amount of energy required to perform the same operation in accordance with the first mode.

12. A non-transitory, computer readable storage medium containing computer software which, when executed by a computer, causes the computer to carry out actions for controlling one or more operations performed by a robotic device in response to a status of a power source, the actions comprising:

monitoring one or more parameters associated with the power source that provides power to the robotic device;

determining one or more performance indicators for the power source based on one or more of the parameters;

assigning, under instruction of a program that defines a plurality of modes for one or more operations performed by the robotic device when reacting to a stimulus, one of the plurality of modes to an operation of the robotic device in response to one or more of the performance indicators for the power source, wherein an amount of energy required from the power source to perform the operation varies according to which mode is assigned to the operation; and controlling the robotic device to perform the operation in accordance with the mode assigned to the operation when reacting to the stimulus, wherein:

when one or more of the performance indicators of the power source correspond to a first predetermined threshold condition, the assigning includes assigning a first mode to one or more secondary operations, which secondary operations are operations that do not result in a movement of the robotic device, and assigning a second mode to one or more primary operations, which primary operations are operations that do result in a movement of the robotic device, and an amount of energy required to perform an operation in accordance with the second mode is greater than the amount of energy required to perform the same operation in accordance with the first mode.

* * * * *